United States Patent [19]

Foglietti

[11] Patent Number: 4,956,752
[45] Date of Patent: Sep. 11, 1990

[54] CYCLOPS LIGHTED MOTORCYCLE HELMET

[76] Inventor: Joe Foglietti, 3120 East Blvd., #C, Bethlehem, Pa. 18017

[21] Appl. No.: 291,169

[22] Filed: Dec. 28, 1988

[51] Int. Cl.⁵ ............................................. F21V 33/00
[52] U.S. Cl. ................................. 362/72; 362/105; 340/432; 340/464
[58] Field of Search ................ 362/72, 105, 106, 276, 362/61, 20, 251, 802; 340/66, 71, 87, 134, 464, 467, 432, 425.5, 479, 455, 438

[56] References Cited

U.S. PATENT DOCUMENTS

| | | | |
|---|---|---|---|
| 2,260,680 | 10/1941 | Nelsen | 340/464 |
| 2,275,695 | 3/1942 | Stafford | 340/464 |
| 2,678,978 | 5/1959 | Reynolds | 340/464 X |
| 4,019,171 | 4/1977 | Martelet | 362/72 X |
| 4,099,159 | 7/1978 | Windisch | 340/66 X |
| 4,186,429 | 1/1980 | Johnston | 362/106 |
| 4,195,328 | 3/1980 | Harris, Jr. | 362/72 |
| 4,224,598 | 9/1980 | Ostrowski | 340/66 |
| 4,559,516 | 12/1985 | Schott et al. | 340/134 X |
| 4,559,586 | 12/1985 | Slarve | 362/72 X |
| 4,667,177 | 5/1987 | Athalye | 340/66 X |
| 4,760,373 | 7/1988 | Reilly | 340/134 |
| 4,812,807 | 3/1989 | Davis et al. | 340/464 |

Primary Examiner—Ira S. Lazarus
Assistant Examiner—D. M. Cox
Attorney, Agent, or Firm—Terry M. Gernstein

[57] ABSTRACT

A motorcycle helmet includes a light signalling system that signals to following vehicles the state of the forward speed of the motorcycle. The light system is adapted to signal red when the cycle's brake is applied in a hard braking maneuver, and to signal green when the forward motion of the vehicle is "normal" that is, either accelerating or continuing, and to signal amber when the brake is lightly applied. A back-up power system is also included.

2 Claims, 3 Drawing Sheets

CYCLOPS LIGHTED MOTORCYCLE HELMET

TECHNICAL FIELD OF THE INVENTION

The present invention relates to the general field of visual safety alarms, and to the particular field of visual safety alarms mounted on motorcycle helmets.

BACKGROUND OF THE INVENTION

As is well known, rear end collisions between motor vehicles are extremely dangerous even when the vehicles are of roughly equal size and have roughly equal safety features. However, as is also well known, when one of the colliding vehicles is much smaller or has less safety features than the other colliding vehicle, that smaller vehicle is much more likely to suffer substantially greater damage than the other colliding vehicle. Collisions between large and small cars are examples of this disadvantageous situation.

As bad as such collisions are, however, a collision involving a car and a motorcycle is much more dangerous than nearly any collision between cars since the motorcycle is generally much smaller than the car and is not nearly as well equipped to protect the rider. The more absence of a roof places the motorcycle rider at a severe disadvantage vis a vis the enclosed automobile in such collisions. Accordingly, the dangers of motorcycle riding have been well documented.

One of the dangers inherent with a motorcycle is the rear brake light placement of such vehicle. Obviously, the rear brake lights of any vehicle act as a deterrent to rear end collisions. Since any collision involving a motorcycle and another vehicle, especially an automobile, should be avoided, the rear end collision should be avoided if at all possible.

To this end, it has been observed that the placement of a motorcycle brake light on the rear fender of the motorcycle is deficient since it is not placed in the most visible location for a following automobile. Accordingly, there have been designs for locating the motorcycle brake light on the helmet of the rider, see U.S. Pat. No. 4,760,373, the disclosure of which is fully incorporated herein by reference. Other proposals have included lights connected to the brake light of the vehicle by quick-disconnected means, see U.S. Pat. No. 4,559,586 and flashing lights on the helmet, see U.S. Pat. No. 4,186,492.

However, while these proposals have been somewhat successful in raising the brake signal light above the level of the rear bumper, these patented designs still fall short in several important areas for fully protecting the motorcycle rider.

For example, due to the extreme danger to the motorcyclist, a very accurate reading of his precise forward velocity condition should be afforded so the following vehicles can be warned even if the motorcyclist simply slows down as even a slight rear end "tap" by a motor vehicle to a motorcycle may be fatal to the motorcyclist. Presently known motorcycle helmet lights do not provide such accurate information, but only signal when the brakes are applied.

The use of brake lights only does not set the cycle off from other vehicles thereby failing to provide a special alert for the following motorist.

Still further, the known helmet lights use either the cycle power or battery power. Such single source lights may leave the motorcyclist unprotected should his cycle motor shut off.

Accordingly, there is a need for a motorcycle brake light that provides highly accurate information as to the precise condition of the motorcycle's forward speed in a highly visible, highly noticeable and highly reliable manner.

OBJECTS OF THE INVENTION

It is a main object of the present invention to provide a motorcycle safety helmet which provides a highly accurate indication of the precise forward speed condition of the motorcycle in a highly visible manner to following motorists.

It is another object of the present invention to provide a motorcycle safety helmet which provides a highly accurate indication of the precise forward speed condition of the motorcycle in a highly visible manner to following motorists and which is conveniently mounted on the rear portion of the helmet.

It is another object of the present invention to provide a motorcycle safety helmet which provides a highly accurate indication of the precise forward speed condition of the motorcycle in a highly visible manner to following motorists and which is conveniently mounted on the rear portion of the helmet and which sends different signals according to the braking condition of the motorcycle.

It is another object of the present invention to provide a motorcycle safety helmet which provides a highly accurate indication of the precise forward speed condition of the motorcycle in a highly visible manner to following motorists and which is conveniently mounted on the rear portion of the helmet and which sends a signal if the motorcycle motor shuts off.

SUMMARY OF THE INVENTION

These, and other, objects are achieved by a motorcycle helmet which has a signal light that signals different colors according to whether the brake pedal is untouched (i.e., the motorcycle is moving forward in the usual manner), lightly depressed (i.e., the motorcycle is being slowed down) or is depressed in a hard braking maneuver (i.e., a stop condition).

The helmet lights can also include a back-up power source that automatically activates a light as soon as the motorcycle motor shuts off. An over-ride switch can be included to de-activate such light.

DETAILED DESCRIPTION OF THE PREFERRED EMBODIMENT

Figure 1:
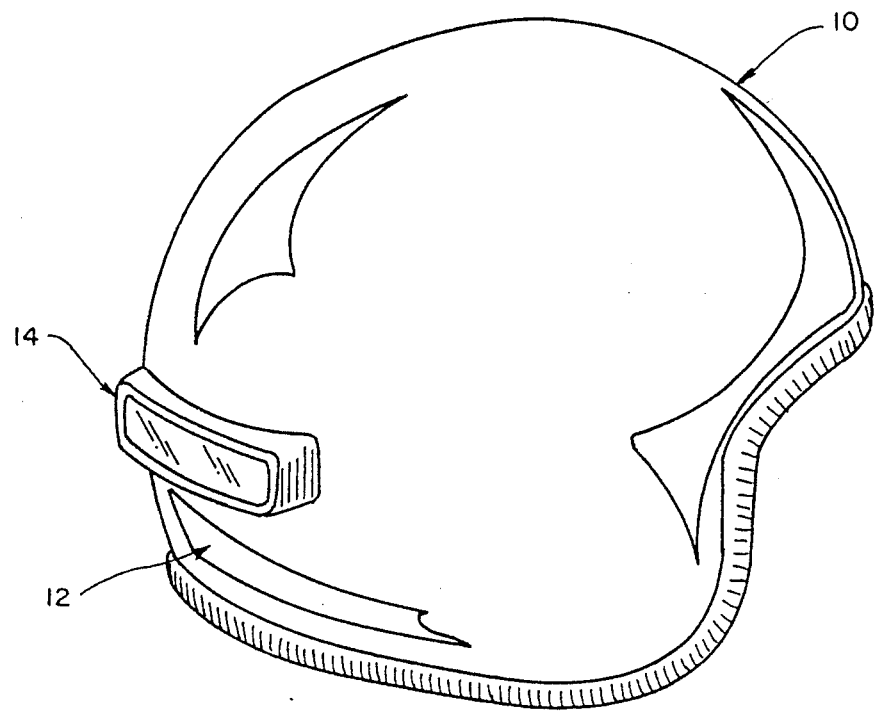
FIG. 1 is a rear perspective view of a motorcycle helmet having a safety light according to the present invention.

Shown in FIG. 1 is a helmet 10 which is adapted to be worn by a motorcycle operator or rider. The helmet includes a head encircling portion and a rear portion 12 which will be visible to following vehicles.

The helmet includes a means for signalling such following motorists of the exact forward speed condition of the motorcycle. This means includes a multi-colored light 14 that is adapted to transmit a green signal light when the motorcycle is in a normal forward speed mode, such as an acceleration mode, or a normal forward speed mode; an amber signal light when the motorcycle the motorcycle operator just begins to slow down, such as by lightly touching the brake pedal; and a red light if the motorcycle is being stopped as by a hard braking maneuver.

Such multicolor signal lights will automatically catch the attention of a following motorist and thus add a measure of safety to the helmet 10 in addition to providing precise information of the state of the motorcycle forward speed.

Figure 2:
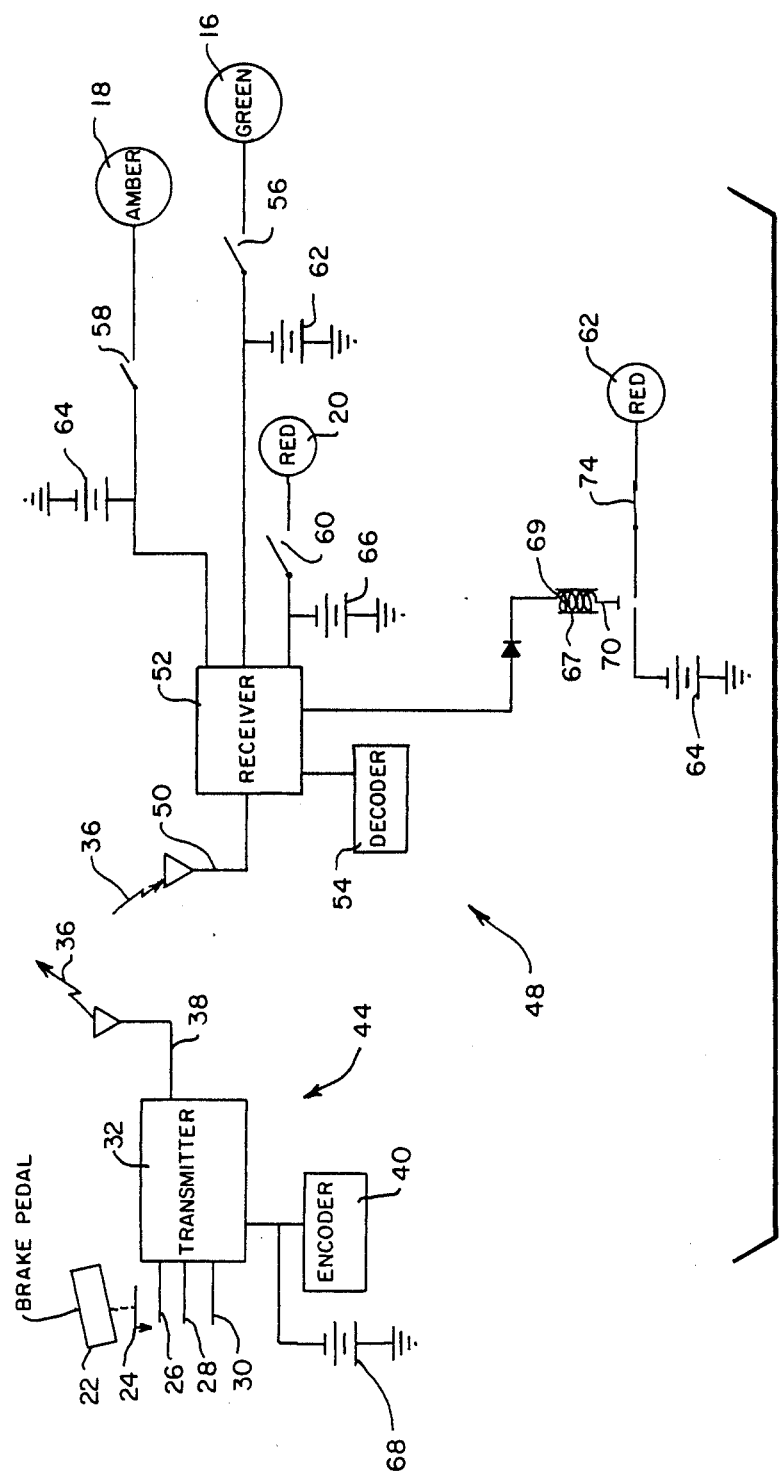
FIG. 2 is a schematic of an electronic circuit suitable for operating the safety light of the present invention.

The multicolored light 14 is operated according to the state of the brake pedal, and a schematic diagram for the control of such light is indicated in FIG. 2. The system will be described functionally with reference to FIG. 2, and examples of the elements suitable for use in such system will be shown and broadly discussed in FIGS. 3–5. However, it should be noted that one skilled in the art of electronic switches could execute the switching circuits based on his knowledge and the functional disclosure presented herein as well as from teaching of switches and switching circuits from sources such as "Switching Circuits and Logical Design" by Samuel H. Caldwell (Published by John Wiley & Sons, Inc in 1962), the disclosure of which is incorporated herein by reference; "Microelectronic Circuits" by Adel S. Sedra and Kenneth C. Smith (Published by Holt, Rinehart and Winston in 1982), the disclosure of which is incorporated herein by reference; or "Circuits, Devices and Systems" by Ralph J. Smith (Published by John Wiley & Sons in 1983) the disclosure of which is incorporated herein by reference. Furthermore, operation of multicolored lights can also be determined by one skilled in the art from disclosures such as U.S. Pat. No. 4,388,589, the disclosure of which is incorporated herein by reference.

Referring to FIG. 2, it is seen that the multicolored light 14 includes a green light 16, an amber light 18 and a first red light 20 which are operated as above discussed to indicate normal forward motion of the cycle, light braking and hard braking of the cycle respectively.

The lights are controlled according to the position of the brake pedal 22 which moves a switch contact 24 to operate co-operating contacts 26, 28 and 30 to activate the green, amber and first red lights respectively as will be apparent from the ensuing discussion.

Movement of the brake pedal 24 and corresponding operation of the co-operating contacts causes a signal transmitter 32 to transmits a signal 36 via an antenna 38. The signal 36 can be an RF signal or an audio signal that is appropriately encoded by an encoder 40, as discussed in U.S. Pat. No. 3,568,161, the disclosure of which is incorporated herein by reference. The signal 36 is a low powered signal so that no FCC license will be required, and there will be little likelihood of interference.

The portion of the device that has just been discussed will be referred to as the transmitter portion 44, and is mounted on the motorcycle in a manner so that it will operate without interference from the motor. Appropriate shielding can be included to ensure such interference-free operation.

As is also indicated in FIG. 2, the system includes a receiver portion 48 that is mounted in the motorcycle helmet and which includes the aforementioned green, amber and red lights. The receiver portion 48 includes an antenna 50 which receives the signal 36 and which includes a receiver 52 connected to a decoder 54 such as discussed in the incorporated patent.

According to the signal 36, the receiver will operate one of the switches 56, 58 or 60 connecting power sources 62, 64 or 66 to associated ones of the green light 16, the amber light 18 or the red light 20 respectively.

Figure 6:
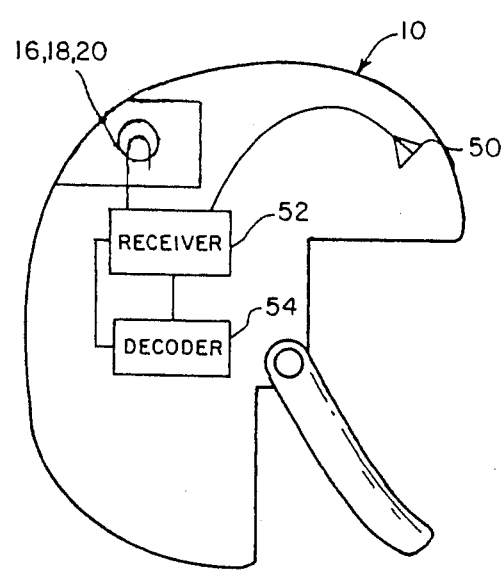
FIG. 6 is a side view of a portion of a switch means associated with the helmet of the present invention.

For the purposes of clarity, the receiver portion 48 is shown in FIG. 6 mounted on the helmet. Only one light is shown in FIG. 6 for the sake of simplicity.

Operation of the transmitter/receiver means shown in FIG. 2 is as follows. With the brake pedal 22 in a cruising position, such as would occur when the cycle is being operated in a normal forward speed or forward acceleration mode, the contact 24 will activate the contact 26 which will cause the transmitter 32 to send an appropriately encoded signal 36 via the antenna 38. The receiver 48 senses this signal via the antenna 50 and the receiver 52 causes the appropriate switch 56 to close thereby powering the green light 16.

Should the cycle operator desire to slow down, he will lightly touch the brake pedal 22 thereby moving the contact 24 to contact 28, which will cause the transmitter 32 to send an appropriate signal to the receiver to de-activate the switch 56 thereby turning off the green light and an appropriate signal to the switch 58 to close that switch to power the amber light 18.

In a corresponding manner, should the cycle operator desire to stop or to slow down suddenly, he will press on the brake pedal in a hard manner, thereby moving the contact 24 to contact 30 to de-activate the amber light and to activate the red light 20 in a manner as discussed above.

Accordingly, once the cycle is moving in a normal forward manner, the signals will include a green light, followed by an amber light, followed by a red light as the cycle is slowed, and finally stopped.

The power for the transmitter 44 can be supplied by the battery associated with the motorcycle. However, if that motor stops in an untoward manner, that power supply may be cut off, thereby jeopardizing the operation of the safety warning light system. In such event, the cyclist will not be able to signal to following motorists that a braking maneuver is being executed. In the event of such loss of motor power, the cycle probably will need to be braked.

Accordingly, the system of the present invention includes a back-up power system 60 that automatically activates a second red light 62, or which is associated with the first red light 20 to activate a warning red light in the event the motor of the cycle is shut off.

The back-up power system includes a back-up power source 64 that is connected to the red light 62 by a switch means 66 that is normally open, but which will close on the loss of power from the main source, such as the cycle battery 68. The normally open switch 66 can include a spring biased solenoid that is held open when power is supplied thereto from the battery 68, but which is biased to close upon loss of such power. The solenoid is indicated as including such a spring 69 and a contact 70 that moves from an open position to a circuit closing position under the influence of the spring. A normally closed switch 74 is included in the circuit and operates to deactivate the light 62 manually. After operation of the switch 74, the circuit can be re-set manually to begin operation again once the power from source 68 is re-established, or can be connected to automatically close once such power from source 68 is re-established.

Figure 3:
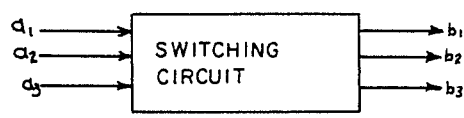
FIG. 3 is a block diagram of a switch suitable for use in operating the safety light of the present invention.
Figure 4:
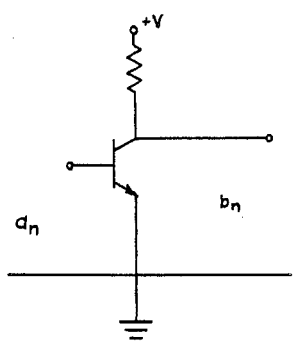
FIG. 4 is a schematic diagram of a switch suitable for use in operating the safety light of the present invention.
Figure 5:
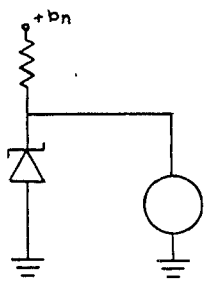
FIG. 5 is a schematic diagram of a circuit suitable for use in association with the lights of the safety light of the present invention.

For the sake of completeness, examples of suitable switches are shown in FIGS. 3-5. The overall switching circuit is indicated in FIG. 3 as including input voltages $a_1$-$a_3$ with $a_1$ being associated with green light 16, voltage $a_2$ being associated with amber light 18 and $a_3$ being associated with red light 20. Corresponding voltage outputs are shown in FIG. 3 as $b_1$-$b_3$ respectively.

The input and output voltages could be used in a switch such as is indicated in FIG. 4, and the respective lights could be lit and held at the desired voltages by a suitable circuit as is indicated in FIG. 5.

The system can be further altered by including appropriate circuits to cause flashing of the lights, or by including circuits that blend colors to create other colors. Of course additional lights can be included to further enhance the signalling system. The present system can be used in the operator's helmet, in the rider's helmet or both, whichever will be most visible to following motorists. The enceder 40 and the de-coder 54 can be altered accordingly to accommodate such variations.

It is to be understood that while certain forms of the present invention have been illustrated and described herein, it is not to be limited to the specific forms or arrangement of parts described and shown.

What is claimed is:

1. A safety helmet, wearable by an operator of a motorcycle having a brake pedal, comprising:
   (A) a protective helmet having a rear portion;
   (B) a multicolored light source mounted on said helmet at said rear portion, and including a green light, an amber light and a red light;
   (C) a plurality of switches, each switch of said plurality of switches being associated with one colored light of said multicolored lights source and adapted to actuate said one colored light;
   (D) switch control means for operating said switches as the brake pedal is operated to activate each colored light as the brake pedal is operated, with said green light being associated with an untouched brake pedal with the motorcycle in a normal forward speed mode, said amber light being associated with a gently depressed brake pedal and said red light being associated with a hard braking action, said switch control means including
      (1) a transmitter attached to the motorcycle brake pedal and adapted to transmit a signal that is associated with the movement of the brake pedal as that brake pedal is operated so that different signals are transmitted as the brake pedal is untouched, depressed gently and depressed in a hard braking action,
      (2) a receiver located inside said protective helmet and which is adapted to receive signals transmitted by said transmitter,
      (3) a motorcycle electrical power source associated with each colored light of said multicolored lights and connected to said receiver and to the switch associated with the associated colored lights by the switches of said switch means so that each colored light of said multicolored lights is activated sequentially as the brake pedal is untouched, depressed gently and depressed in a hard braking action to be green, then to go amber and then red as said brake pedal is moved from a non-brake activating position in a normal cruising mode to a hard braking position; and
   (E) loss of power signal circuit means which includes
      (1) a second red light,
      (2) a backup power source,
      (3) a first line conductor connected to said backup power source,
      (4) a second line conductor connected to said second red light,
      (5) a normally open switch connecting said backup power source to said second red light when closed, said normally open switch including
         (a) an electrical contact with electrically connects said first line conductor to said second line conductor and which is movable from a first position contacting both of said first and second line conductors to a second position spaced from both of said first and second line conductors,
         (b) a solenoid connected to said motorcycle electrical power source and attached to said electrical contact to move said electrical contact between said first and said second positions,
         (c) a spring biasing said solenoid to move said electrical contact into said first position, said soleniod holding said electrical contact in said second position against the bias of said spring when said soleniod is energized from said motorcycle electrical power source,
      (6) a normally closed switch in said second line conductor, said normally closed switch being manually operable to open said loss of power circuit means and separate said second red light from said backup power source.

2. The safety helmet defined in claim 1 wherein said switch control means further includes
   (4) a code means associated with said transmitter so that said signals are transmitted in a code associated with said helmet, and
   (5) a decoder means associated with said receiver to decode the coded signals transmitted by said transmitter.

* * * * *